United States Patent [19]

Nakagome et al.

[11] 4,097,903
[45] Jun. 27, 1978

[54] FACSIMILE SIGNAL CODING SYSTEM

[75] Inventors: Yukio Nakagome, Yokohama; Hiroichi Teramura, Tokyo; Yasuhiro Yamazaki, Hiratsuka; Yasushi Wakahara, Tokyo, all of Japan

[73] Assignee: Kokusai Denshin Denwa Kabushiki Kaisha, Japan

[21] Appl. No.: 736,738

[22] Filed: Oct. 29, 1976

[30] Foreign Application Priority Data

Oct. 30, 1975 Japan .................................. 50-130841

[51] Int. Cl.² .............................................. H04N 1/00
[52] U.S. Cl. .................................................. 358/261
[58] Field of Search ........................ 358/261, 133, 135

[56] References Cited

U.S. PATENT DOCUMENTS

3,769,453  10/1973  Bahl et al. ............................ 358/261
3,937,871  2/1976   Robinson ............................. 358/261

Primary Examiner—Richard Murray
Attorney, Agent, or Firm—Robert E. Burns; Emmanuel J. Lobato; Bruce L. Adams

[57] ABSTRACT

A facsimile signal coding system for successively coding runs of black and white signals included in a facsimile signal obtained by scanning an original picture, in which the length and position on a scanning line of the runs of the black or white signal to be indicated by encoded codes are temporarily stored in a memory. Information of the run of the same state signal as an instant run of black or white signal to be coded and close to the instant run is taken out as reference run information from the memory. The length of the instant run of the black or white signal to be coded is predicted on the base of the reference run information. An error between the predicted run length and the length of the instant run of black or white signal to be coded is coded. When the error exceeds a predetermined value, the length of the instant run of the black or white signal may be coded in place of the error.

8 Claims, 14 Drawing Figures

FACSIMILE SIGNAL CODING SYSTEM

This invention relates to a coding system which is comployed for efficient transmission or storage of signals having a two-dimensional correlation, such as facsimile signals.

The systems which have heretofore been proposed for coding of facsimile signals are (1) a run-length coding system in which signals of one scanning line, obtained by scanning, are converted to the time serial configuration and then the magnitudes of the run lengths of white and black are sequentially coded and transmitted; and (2) a plane coding system in which signals of a plurality of scanning lines are subjected to batch processing, and then coded and transmitted. However, the coding system (1) does not utilize the property of picture signals, that they have a high correlation in a vertical direction, and hence is not sufficient in the compression effect. The system (2) is excellent in the compression effect, as compared with the system (1), but has such a demerit that a memory used becomes generally large and complicated in construction.

An object of this invention is to provide a facsimile signal coding system which avoids the defects of the abovesaid two coding systems, and greatly elimiantes redundancy of the facsimile signal with a memory of a relatively small capacity and a simple equipment, thereby to enable remarked compression of a required transmission time with respect to the band-time integral.

The principle of this invention is as follows: When to encode the length of an instant run of white and black signal after the facsimile signal is converted to the time serial configuration, the length of the instant run to be coded is predicted on the basis of already coded run lengths, and an error between the predicted value and the actual value is encoded. If the error exceeds a predetermined value, the length of the instant run of the black or white signal may be coded in place of the error.

The invention will be described in detail below with reference to the accompanying drawings, in which.

Figures 1, 2A:
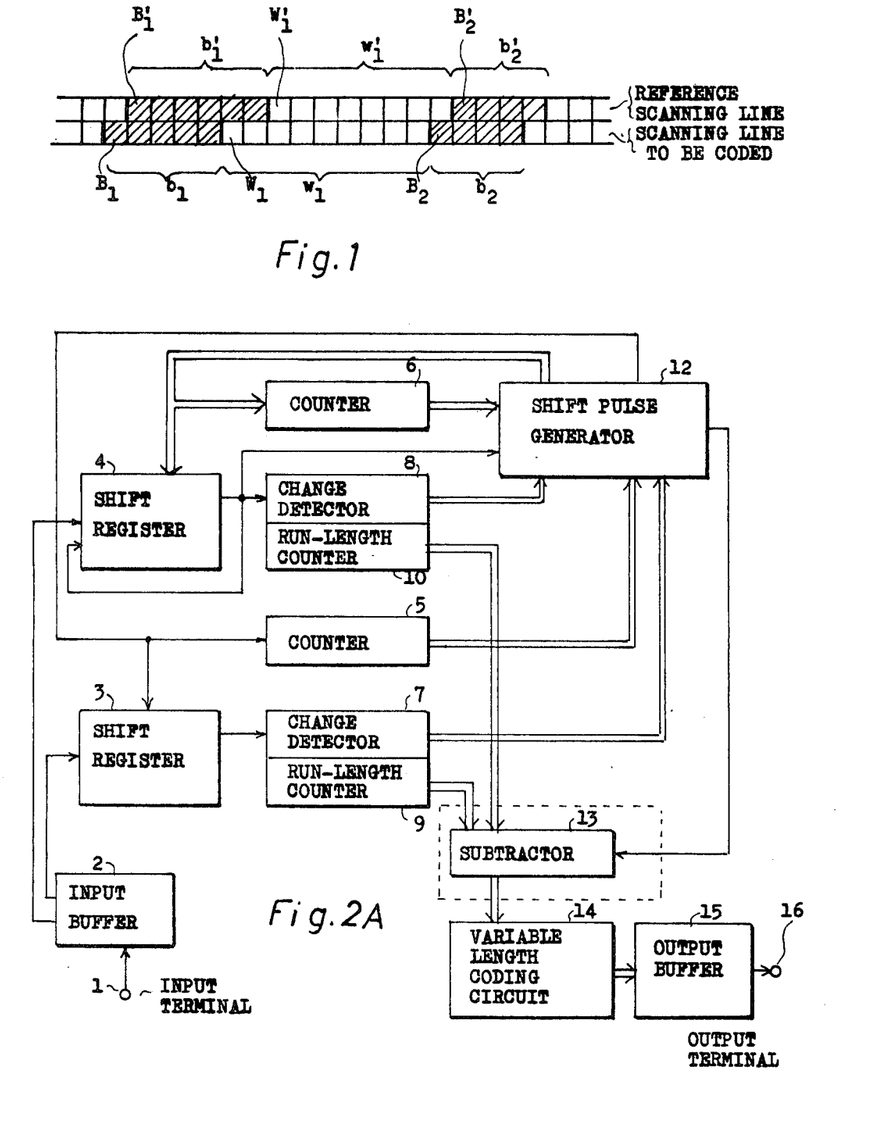
FIGS. 1, 5A, 5B, 10 and 11 show scanning line arrangement patterns explanatory of the principle of this invention.
FIGS. 2A and 6 are block diagrams each illustrating an embodiment of this invention.

With reference to FIG. 1, an example of coding according to this invention will be described. Hatched picture elements represent black picture elements and non-hatched ones white picture elements. Reference characters $b_1$ and $b_2$ indicate the runs of black on a coding scanning line which are to be coded; $b'_1$ and $b'_2$ designate the runs of black on a reference scanning line immediately preceding the scanning line to be coded; $w_1$ identifies the run of white on the coding scanning line; and $w'_1$ represents the run of white on the reference scanning line. For example, if the length of the run $b_1$ of black is represented with $\overline{b_1}$, the run $b_1$ of black is coded by directly coding $\overline{b_1}$ in the conventional run-length coding system. In the system of this invention, for example when to encode the run $b_1$ of black, the run $b'_1$ of black on the reference scanning line which is considered to have th highest correlation to $b_1$ is selected at first, and $\overline{b'_1}$ is used as a predicted value of $\overline{b_1}$, and then a difference $\overline{b_1} - \overline{b'_1}$ between the runs of them is coded. This applies to the run $w_1$ of white. That is, the run $w'_1$ of white is selected which is considered to have higher correlation to $w_1$ than any others on the reference scanning line, and a difference $\overline{w_1} - \overline{w'_1}$ is coded. The same is true of the other runs, too. The run which is considered to have higher correlation to the run to be coded than any others on the reference scanning line (which run will hereinafter be referred to as the reference run), is selected, for example, in the following manner. This will be described in connection with the run $b_1$ of black. If the picture element (on the reference line) just above a first picture element ($B_1$ in FIG. 1) of the run $b_1$ of black is a black picture element, the run of black including this black picture element is decided to have the highest correlation to $b_1$. In a case where the picture element on the reference scanning line just above the first picture element $B_1$ of the run $b_1$ of black is a white picture element, the run of black on the reference scanning line following the run of white including the white picture element is decided to bear the highest correlation to $b_1$. The example of FIG. 1 shows the latter case, and the run which has the highest correlation to the run $b_1$ of black, i.e. the reference run, is decided to be $b'_1$. In exactly the same manner as described above, the reference run is also decided in connection with the run of white. For example, the reference run for the run $w_1$ of white is $w'_1$.

However, in a case where no run of black exists on the reference scanning line, that is, in such a case where the picture elements on the reference scanning line are all white, it is considered possible to employ such a method in which the run of black of a predetermined number of picture elements are assumed to exist on the reference scanning line, for example, at its right-hand end so that coding is achieved using the run of black as the reference, or a method in which no prediction is effected so that the run length $b_1$ of black is directly coded as is the case of the ordinary run-length coding method.

A concrete coded bit allocation is carried out, for instance, in the following manner. That is, when the prediction is fulfilled (when a difference between the runs is zero), only one bit "0" is produced. When the prediction is not fulfilled, that is, when the error between the run to be coded and the run on the reference scanning line of the same polarity is not zero, one bit "1" indicating that the error is not zero is produced so that "0" or "1" is added depending upon whether the sign of the error is + or −, and further the absolute value of the error is coded in accordance with Table 1. Runs $b_1$, $w_1$ and $b_2$ in FIG. 1 are coded as follows:

Table 1

| $b_1$ | $w_1$ | $b_2$ |
|---|---|---|
| 1 1 0 | 1 0 0 | 0 |

| Avsolute value of difference | Sign |
|---|---|
| 1 | 0 |
| 2 | 1 0 |
| 3 | 1 1 0 |
| 4 | 1 1 1 0 |

Table 1-continued

| | | |
|---|---|---|
| Sign of difference | + | 0 |
| | − | 1 |
| When difference is zero | | 0 |
| When difference exists | | 1 |

In a first scanning line of the original picture, no reference scanning line exists but, in this case, it is considered possible to use a method of coding on the assumption that the reference scanning line is a scanning line whose picture elements are all white, or a method of effecting the ordinary run-length coding only in connection with the first scanning line.

FIG. 2 shows an example of this invention. In FIG. 2, reference numeral 1 indicates an input terminal to which is applied a read out facsimile signal; 2 designates an input buffer for temporarily storing the input facsimile signal; 3 identifies a shift register for reading and storing from the input buffer 2 the information of one scanning line (the scanning line to be coded) for coding; 4 denotes a shift register for storing the information of the scanning line (the reference scanning line) immediately preceding the scanning line applied to the shift register 3 and capable of shifting in two directions; 5 represents a counter for counting the number of times of shifting of the content of the shift register 3; 6 shows a reversible counter for couting the number of times of shifting of the content of the shift register 4; 7 and 8 refer to change detectors for respectively detecting information change picture elements (picture elements having changed from white to black or from black or white) having information different from that of immediately preceding picture elements when the contents of the shift registers 3 and 4 are respectively shifted; 9 and 10 indicate counters called as run-length counters for respectively obtaining the numbers of picture elements from the time of detection of the changes to the time of detection of the next changes by the change detectors 7 and 8; 12 designates a shift pulse generator which receives the results of operations in the change detectors 7 and 8 to generate shift pulses for shifting the contents of the shift registers 3 and 4; 13 identifies a subtractor for subtracting the value of the run-length counter 10 from the value of the run-length counter 9 at the time of receiving the pulse from the shift pulse generator 12; 14 denotes a variable-length coding circuit for converting the output from the subtractor 13 into a variable-length code in accordance with, for example, the principle shown on Table 1; 15 represents an output buffer for temporarily storing the output from the variable-length coding circuit 14 and delivering it out at a constant speed; and 16 shows an output terminal.

The operation of the circuit of FIG. 2 is as follows: The facsimole signal read out by scanning from the original picture to be transmitted is temporarily stored in the input buffer memory 2 through the input terminal 1. The facsimile signal thus stored in the input buffer memory 2 is read out line by line into the shift register 3 for coding. At this time, the shift register 4 is at a standstill in the condition that information of the scanning line (the reference scanning line) immediately preceding the scanning line stored in the shift register 3 is stored in the shift register 4, and this information is used as reference information in the coding of the information stored in the shift register 3. The information of the scanning line to be coded, stored in the shift register 3, is shifted by the shift pulse of the shift pulse generator 12 and the picture elements are delivered out one by one from the left end of the picture frame to the change detector 7. In the change detector 7, it is always examined whether or not the information of the picture element received at each timing is different from the immediately preceding picture element. The counter 5 indicates how many times the shift register 3 has been shifted, in other words, to which picture element from the left end of the original picture the picture element information having been just delivered out from the shift register 3 to the change detector 7 corresponds. When detecting a change of the facsimile signal from white to black or from black to white, the change detector 7 applies a pulse indicative of the detection of the change to the shift pulse generator 12 and, at the same time, supplies thereto information of the direction of the change. As a result of this, the shift pulse generator 12 stops the supply of the shift pulse to the shift register 3 to stop its operation. At this time, the run-length counter 9 indicates the number of picture elements counted from the time of the immediately preceding change detection to the time of the instant one, in other words, the run length in this time interval. For the sake of easy explanation, the following description will be given with respect to the example of the facsimile signal of FIG. 1 and on the assumption of coding the white run $w_1$ at the time of the change picture element $B_2$ from white to black. The counter 5 indicates the absolute address (the number of picture elements counted from the left end of the picture frame) of the picture element $B_2$ following the white run $w_1$, while the counter 9 indicates the length $\overline{w_1}(=9)$ of the white run $w_1$.

When the operation of the shift register 3 is stopped to detect the change point ($B_2$) on the scanning line to be coded, as described above, the next step is to find out a change point on the reference scanning line, detect the run of the same information of white or black as the run to be coded and determine the reference run. The determination of the reference run is achieved in the following manner In the shift pulse generator 12, there is stored the previous count value of the counter 5, that is, the absolute address of the change point ($W_1$) immediately preceding the change point $B_2$, the absolute address of which is being indicated, and this value is compared with the value of the counter 6. At this time, the counter 6 indicates where the picture element (that is, $w'_1$ in this example) at the output of the shift register 4 stands from the left end of the original picture, as is the case with the counter 5. In the shift pulse generator 12, the count value (which is taken as $x$) of the counter 6 and the previous count value (which is the absolute address of $W_1$ in FIG. 1 and is take as $y$) of the counter 5 are compared with each other, and if $x > Y$, a backward shift pulse (The operation that the picture element at the output of the shift register 4 is sequentially shifted toward the left end of the original picture is defined as the backward shift, and the normal righward shift reverse to the above is defined as a forward shift. Pulses for achieving these shifts will hereinafter be referred to as a backward shift pulse and a forward shift pulse, respectively.) is applied to the shift register 4 to cause it to shift in the backward direction. When the shift register 4 is backwardly shifted to provide $x = y$, the supply of the backward shift pulse is stopped. If $x < y$, the shift pulse generator 12 applies the forward shift pulse to the shift register 4, and when $x = y$ is reached, the supply of the pulse is similarly stopped.

When $x = y$ is thus provided, the shift pulse generator 12 compares the information of black or white of the to-be-coded run $W_1$ (In this example, the run is white and this is known from the change detector 7.) with the information (black) of the picture element at the output of the shift register 4, that is, the picture element right above the picture element $W_1$ in the example of FIG. 1. (i) When the both are identical with each other, the run including the picture element just above the picture element $W_1$ is the reference run, so that the shift pulse generator 12 starts to supply a backward shift pulse to the shift register 4, and when a change is detected by the change detector 8, the supply of the pulse is stopped. (ii) When the both are different from each other, the run following the run including the picture element just above the picture element $W_1$ is the reference run, so that the shift pulse generator 12 starts to supply the forward shift pulse to the shift register 4, and when a change is detected by the change detector 8, the supply of the pulse is likewise stopped. In the example of FIG. 1, since the information of the run $w_1$ to be coded is white and since the information of the picture element just above the picture element $W_1$ is black, this case corresponds to the abovesaid case (ii), and when the shift register 4 shifts in the forward direction by two shift pulses to derive at its output the picture element $W'_1$ in FIG. 1, the shift register stops.

When the starting picture element $W'_1$ of the reference run $w_1$ is detected in the abovesaid way, the run length $\overline{w'_1}$ of the reference run $w'_1$ is calculated. Namely, the shift pulse generator 12 starts to apply the forward shift pulse to the shift register 4, and when the change detector 8 detects the next change point (when the picture element $B'_2$ is detected in the example of FIG. 1), the supply of the shift pulse is stopped. The value indicated by the run-length counter 10 at this time is the run length $\overline{w'_1}$ of the reference run $w'_1$. Next, in the subtractor 13, the run length $\overline{w'_1}$ of the reference run $w'_1$ indicated by the counter 10 is subtracted from the run length $\overline{w_1}$ of the to-be-coded run $w_1$ indicated by the run-length counter 9, and the result of this subrraction is encoded by the variable-length coding circuit 14 using a known variable-length coding method into a variable-length code, as shown in Table 1. This output is temporarily stored in the output buffer 15 and then delivered out therefrom to the transmission line through the output terminal 16.

Figure 3:
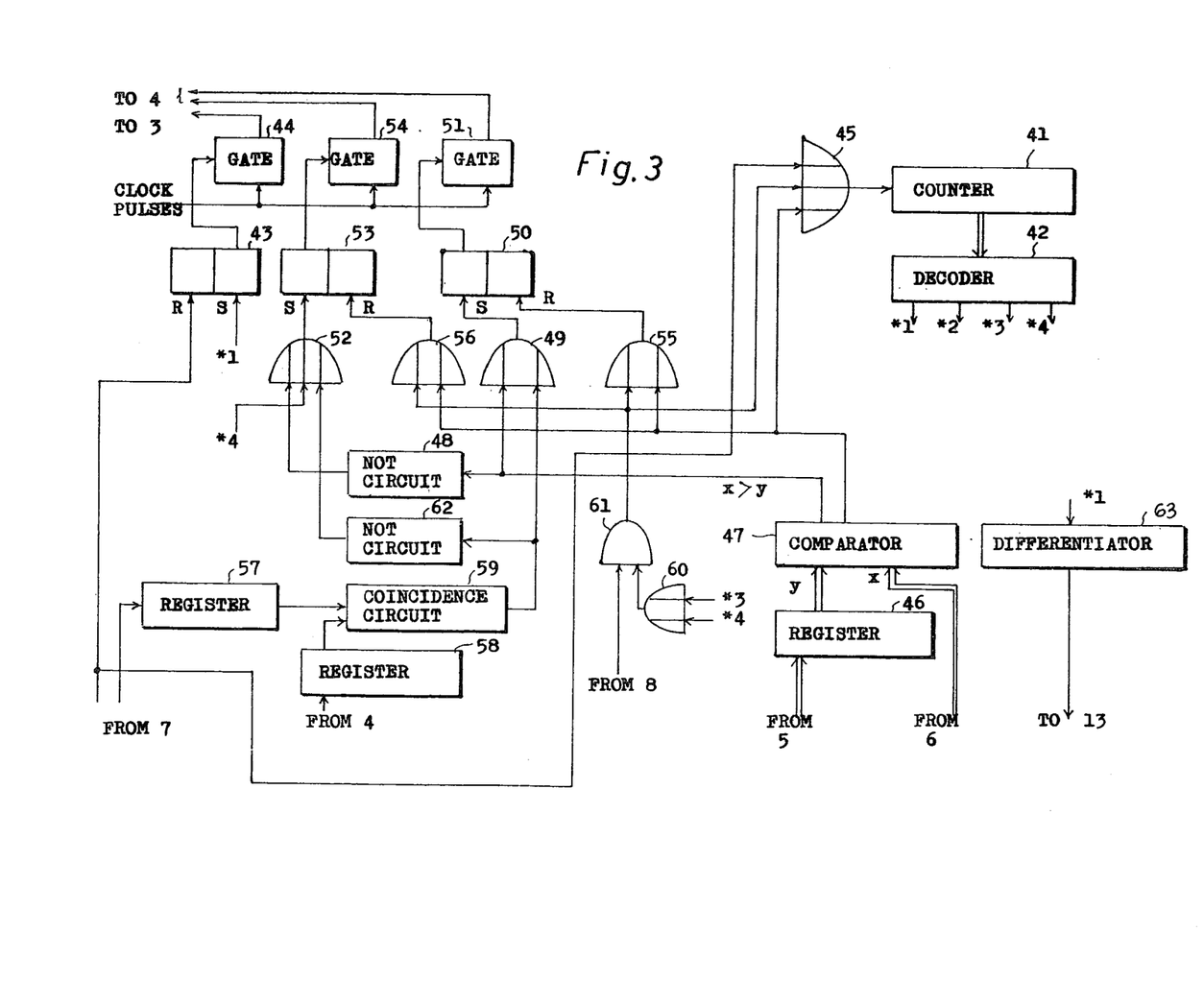
FIGS. 3 and 7 are block diagrams illustrating example of shift pulse generators respectively employed in the embodiments shown in FIGS. 2A and 6.

FIG. 3 illustrates in detail the shift pulse generator 12 shown in FIG. 2. As already described, this is a circuit for generating shift pulses for causing the shift registers 3 and 4 to perform their shift operation, and the operation of this circuit is divided into four states as follows:

(i) An operation of shifting the shift register 3 to detect a change point and stopping the shift;

(ii) An operation of shifting the shift register 4 to obtain the value $x = y$;

(iii) An operation of shifting the shift register 4 to the first picture element of the reference run and stopping the shift; and (iv) An operation of shifting the shift register 4 to the last picture element of the reference run and stopping the shift. In FIG. 3, reference numeral 41 indicates a 2-bit counter indicative of the abovesaid four states; and 42 designates a decoder whose output *1 is in the ON-state, for example, in the case of the state (i).

Now, let it be assumed that the state (iv) has been completed and altered to the state (i). Then, the output *1 is turned -ON, so that a flip-flop 43 is set to open a gate 44, through which clock polses are applied to the shift register 3. This pulses serve as the shift pulses for shifting the shift register 3. When the shift register 3 shifts and the change detector 7 detects a change point, the flip-flop 43 is reset to close the gate 44 to stop the supply of the pulses to the shift register 3 and hence stop its shifting. At this time, since the pulse from the change detector 7 is applied to the counter 41 through an OR circuit 45, the state (ii) is brought about to turn ON the output *2.

Reference numeral 46 identifies a register, which stores the previous count value ($y$ mentioned previously) of the counter 5. This value and the count value ($x$ mentioned previously) of the counter 6 are compared in magnitude with each other in a comparator 47. When $x = y$, the comparator 47 produces a pulse, since this pulse is applied to the counter 41 through the OR circuit 45, the state is immediately altered to the state (iii). If $x > y$, the comparator 47 applies pulses to a NOT circuit 48 and an OR circuit 49. By the output pulse from the latter, a flip-flop 50 is set to open a gate 51, through which clock pulses are applied to the shift register 4. There are the backward shift pulses. Conversely, if $x < y$, a flip-flop 53 is set through an OR circuit 52 to open a gate 54, through which clock pulses are also applied to the shift register 4. These are the forward shift pulses. When the shift register 4 shifts to reach $x = y$, the comparator 47 applies pulses to OR circuits 55 and 56 to reset the flip-flops 50 and 53, so that the supply of the shift pulses to the shift register 4 is stopped and, at the same time, by the pulse through the OR circuit 45, the operation state is shifted to the state (iii).

When the operation state is changed to the state (iii), the output *3 is turned -ON. Reference numerals 57 and 58 denote registers. The registers 57 and 58 receive 1-bit information from the change detector 7 and the shift register 4, respectively, and indicate the information (white or black) of the to-be-coded run and the information (white or black) of the picture element lying at the output of the shift register 4, respectively. Reference numeral 59 identifies a coincidence circuit. If the outputs from the registers 57 and 58 are coincident with each other, the coincidence circuit 59 derives therefrom a pulse, so that the backward shift pulses are applied to the shift register 4 in the same manner as the abovesaid operation. Reference numeral 60 represents an OR circuit, and 61 shows an AND circuit. When the shift register 4 is shifted in the backward direction and a change is detected by the change detector 8, both inputs to the AND circuit 61 are turned -ON to reset the flip-flops 50 and 53 to stop the supply of the shift pulse to the shift register 4. Further, if the outputs from the registers 57 and 58 are different from each other, the coincidence circuit 59 does not produce any pulse but instead the NOT circuit 62 produces a pluse, by which the flip-flop 53 is reset to apply the forward shift pulses to the shift register 4, and when the change detector 8 detects a change point, the shift operation of the shift register 4 is likewise stopped. When the AND circuit 61 produces a pulse, this pulse is applied to the counter 41 through the OR circuit 45, thus shifting the operation state to the state (iv).

When the operation state is altered to the state (iv), the output *4 is turned -ON to set the flip-flop 53 through the OR circuit 52, and the forward shift pulses are applied to the shift register 4. Thereafter, when a change is detected by the change detector 8, the AND circuit 61 produces a pulse and, as a result of this, the shift operation of the shift register 4 is stopped and the counter 41 indicates the state (i), and the output *1 is turned -ON to restore the initial operation. Further, when the output *1 is turned -ON, a differentiator 63 produces a pulse, which is applied to the subtractor 13 to cause it to start its subtracting operation.

Figure 4:
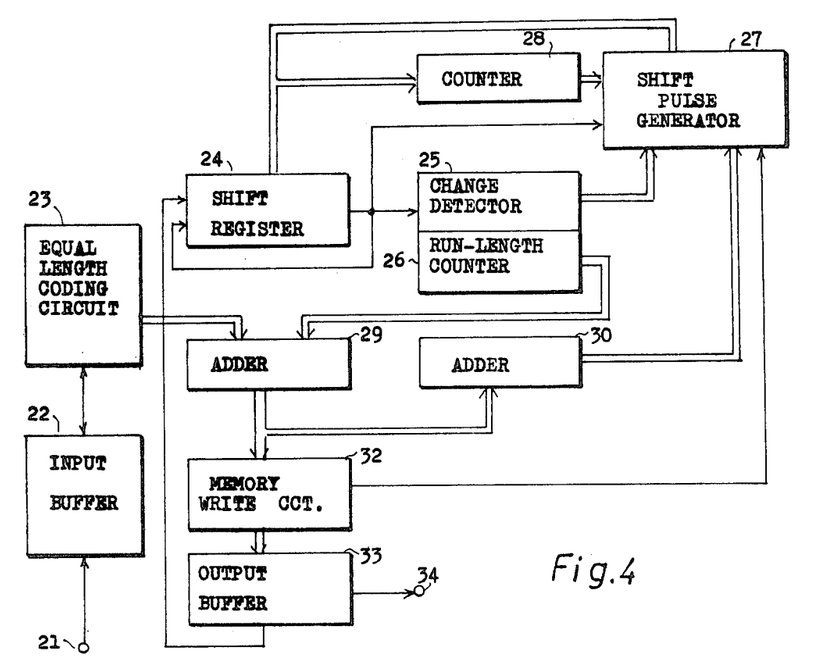
FIGS. 4 and 8 are block diagrams showing examples of receivers for the reception of facsimile signals respectively produced by the embodiments shown in FIGS. 2A and 6.

FIG. 4 is a block diagram illustrating a concrete example of the receiving side for the reception of a facsimile signal transmitted according to the system of this invention. Reference numeral 21 indicates an input terminal for receiving a coded facsimile signal; 22 designates an input buffer memory for temporarily storing the received facsimile signal; 23 identifies a known equal-length coding circuit for converting the variable-length codes shown in Table 1 into equal-length codes; 24 denotes a reversible shift register for storing the signal of a reference scanning line of an already decoded facsimile signal; 25 represents a change detector which receives the shifted picture element information from the shift register 24 to examine whether or not the picture element information is different from the immediately preceding one, and, if different, provide its change-indications information and the information of the change direction (from white to black or from black to white); 26 shows a counter called as a run-length counter which receives the output from the change detector 25 to obtain the distance (the number of picture element) between the picture element having detected the change (the change point) and the picture element having detected the next change, that is, the run length between the two change points; 27 refers to a shift pulse generator which receives the information from the change detector 25 to generate pulses for forwardly or backwardly shifting the shift register 24; and 28 indicates a counter which counts the number of pulses from the shift pulse generator 27, in other words, indicate which picture element counted from the left end of the original picture is lying at the output of the shift register 24. Reference numeral 29 designates an adder which receives the facsimile equal-length coded information from the equal-length coding circuit 23 and the run-length information of the reference run from the run-length counter 26 to add them together for calculating the actual run length of the coded run; 30 identifies an adder which is reset to zero at the start of decoding of each scanning line and successively adds the decoded run length of the coded run to provide the absolute address of the picture element following the decoded run; 32 denotes a memory write circuit which receives the run-length information of the decoded coded-run to write this information in an output buffer 33; 33 represents the output buffer which stores the decoded facsimile signal until it is recorded; and 34 shows an output terminal through which the decoded facsimile signal is applied from the output buffer 33 to a recording section.

The operation of the receiving side shown in the block diagram of FIG. 4 is as follows: The received facsimile coded signal is temporarily stored in the input buffer 22 through the input terminal 21. The signal stored in the input buffer 22 is the variable-length code shown in Table 1 but, in the equal-length coding circuit 23, the signal is converted into equal-length codes of the same length (for example, ten bits). On the other hand, the shift register 24 has stored therein an already-decoded facsimile signal, and this shift register 24 and the circuits 25, 26, 27 and 28 respectively perform substantially the same operations as the shift register 4, the change detector 8, the run length counter 10, the shift pulse generator 12 and the counter 6 shown in FIG. 2, by which the reference run is determined, and the run length of the reference run is obtained as the output from the run-length counter 26. When the run length of the reference run is obtained, the actual run length of the coded run can be obtained by adding the output from the equal-length coding circuit 23 on the output of the run-length counter 26, and this calculation is accomplished by the adder 29. By successively accumulating the results of the addition from the adder 30, the adder 30 comes to indicate the absolute address of the starting picture element of the next coded run. Further, the output from the adder 29 is applied to the memory write circuit 32 and stored therein in the form of a facsimile picture signal which can be recorded in the output buffer 33. In this way, decoding is successively achieved and, upon completion of decoding of the information of each scanning line, since the information of the scanning line is used as the information of the reference run in the next decoding, it is applied to the shift register 24 and the adder 30 is set to zero.

Then shift pulse generator 27 in FIG. 4 is substantially the same as that in FIG. 3, but since the output from the adder 30 always indicates the absolute address ($y$) of the starting picture element of the coded run, the output from the adder 30 will be connected directly to the comparator 47 in this case, not through the register 46. Moreover, in FIG. 4, there are not provided the circuits corresponding to the change detector 7 and the shift register 3 in comparison with FIG. 2. Consequently, the shift pulse generator 27 does not require the flip-flop 43 and the gate 44 shown in FIG. 3. Further, the register 57 takes the form of a flip-flop. Since this flip-flop is required only to indicate the information (white or black) of the coded run, the input thereto is the output pulse from the memory write circuit 32.

Figure 5A:
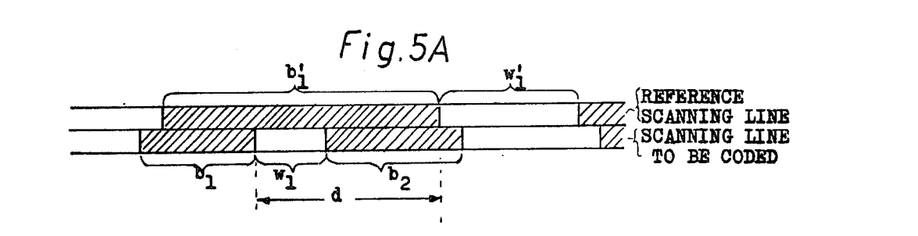

The above is an example of algorithm of predicting the length of the run and, of course, other various prediction algorithms can be adopted. For instance, in the method described above, the reference runs used for coding the runs $b_1$, $w_1$ and $b_2$ shown in FIG. 5A are respectively $b'_1$, $w'_1$ and $b'_2$. By the way, since the reference black run $b'_1$ overlaps not only the black run $b_1$ but also the black run $b_1$, it is considered that the reference run $b'_1$ is divided into runs $b_1$ and $b_2$ on the next scanning line. This equally applies to the case of FIG. 5B in which the white and black runs are reverse to those in the above. Where the reference run of the coded run ($b_2$ in FIG. 5A) is such a run ($b'_1$ in FIG. 5A) which overlaps the run ($b_1$ in FIG. 4) of the same information as the coded run and immediately preceding the coded run, it may be adopted to employ such a method that a run-length predictive value $\hat{b}_2$ of the coded run $b_2$ is made not $\overline{b'}_1$ normally used but, for example, $\overline{b'}_1 - \overline{b}_1$, or $\overline{b'}_1 - (\overline{b}_1 + \overline{w}_1)$ or $\overline{b}_1$.

As another coding algorithm, the following coding method is also adopted. Namely, instead of coding the difference $\bar{r} - \hat{r}$ between the run length $\bar{r}$ and the predictive value $r$ of a run $r$ to be coded at all times, $\bar{r}$ and $|\bar{r} - \hat{r}|$ are compared with each other, and (i) When $\bar{r} < |\bar{r} - \hat{r}|$, $\bar{r} - \hat{r}$ is coded and
(ii) When $|\bar{r} - r| \leq r$, $\bar{r} - \hat{r}$ is coded.

Figure 2B:
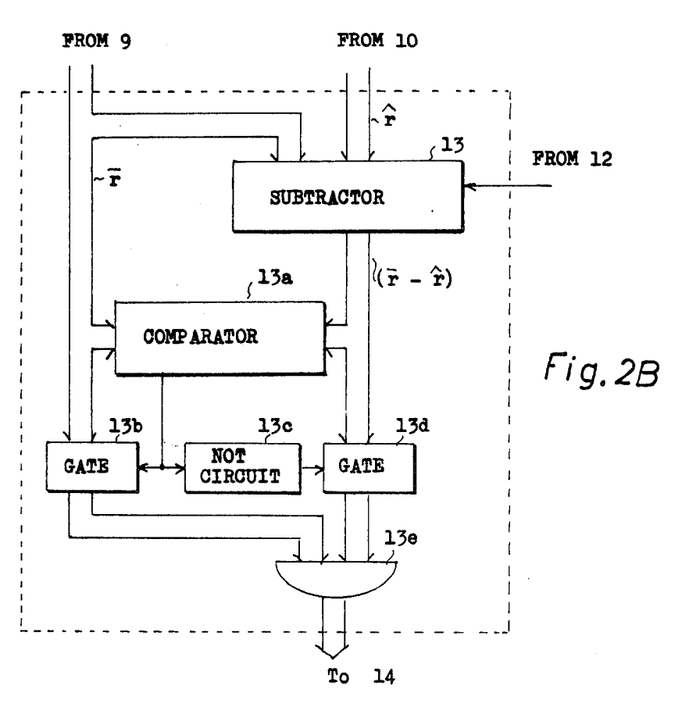
FIGS. 2B and 2C are block diagrams each illustrating a modification of a part of the embodiment shown in FIG. 2A.

This method is suitable for use in a case where prediction often comes far wrong, and can be realized by a circuit shown in FIG. 2B.

FIG. 2B is a modification of a dotted rectangular section in FIG. 2A. In FIG. 2B, the subtractor 13 produces an error $\bar{r} - \hat{r}$ between the run length $\bar{r}$ and the predictive value $\hat{r}$ of an instant run $r$ to be coded. A comparator 13a compares the run length $\bar{r}$ and the error $\bar{r} - \hat{r}$ and produces a pulse when the error $\bar{r} - \hat{r}$ exceeds the run length $\bar{r}$ of the instant run $r$. In this case, the run length $\bar{r}$ passes through a gate 13b and an OR gate 13e. When the error $\bar{r} - \hat{r}$ is less than the run length $\bar{r}$, the error $\bar{r} - \hat{r}$ passes through a gate 13d, which is opened in response to a pulse from a NOT circuit 13c, and the OR gate 13e.

Figure 2C:
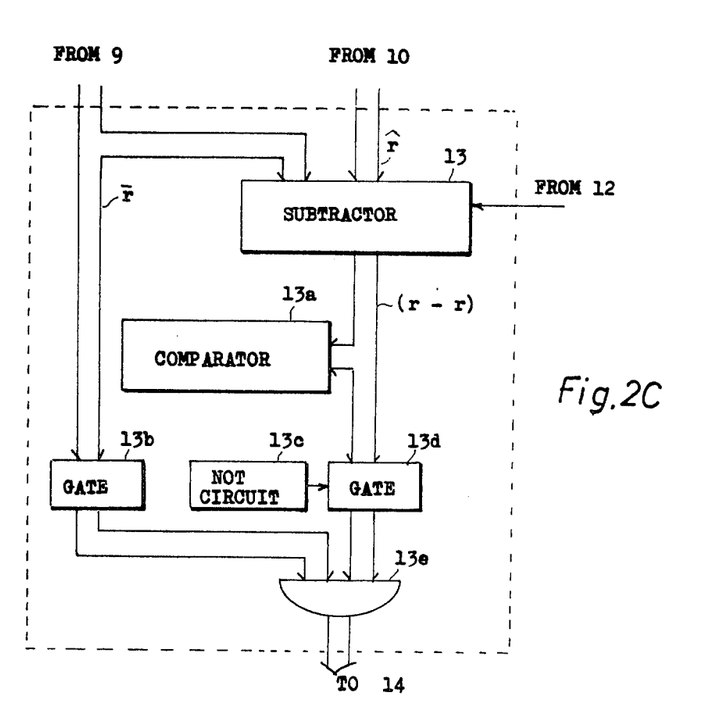

If FIG. 2B is modified as shown in FIG. 2C, the comparator 13a generates a pulse when the error $\bar{r} - \hat{r}$ exceeds a predetermined value preset therein. Other operations will be understood from the above explanation.

Figure 5B:
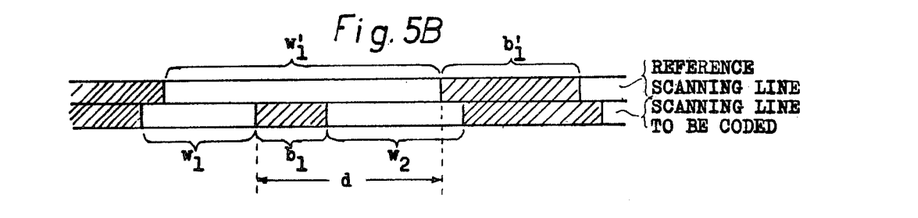

Further, in such cases of $w_1$ in FIG. 5A and $b_1$ in FIG. 5B in which the immediately preceding portions on the scanning line are not the same information as the above runs, coding of the run lengths $\bar{w}_1$ and $\bar{b}_1$ without achieving the abovesaid prediction sometimes reduces the number of coded bits. For deciding that the run to be coded and the immediately preceding portion on the scanning line are not the same information, it is possible to utilize the length of deviation ($d$ in FIGS. 5A and 5B) between the coded run immediately preceding the run to be coded and the reference run. That is, when $d$ is smaller than a predetermined number D (for example, 2, 3, 4, 5 or so), the runs $w_1$ (FIG. 5A) and $b_1$ (FIG. 5B) are rendered into predictive codes, and when the length of deviation $d$ is larger than D, the runs $w_1$ and $b_1$ are not predicted but instead the lengths $\bar{w}_1$ and $\bar{b}_1$ of these runs are directly coded.

Figure 6:
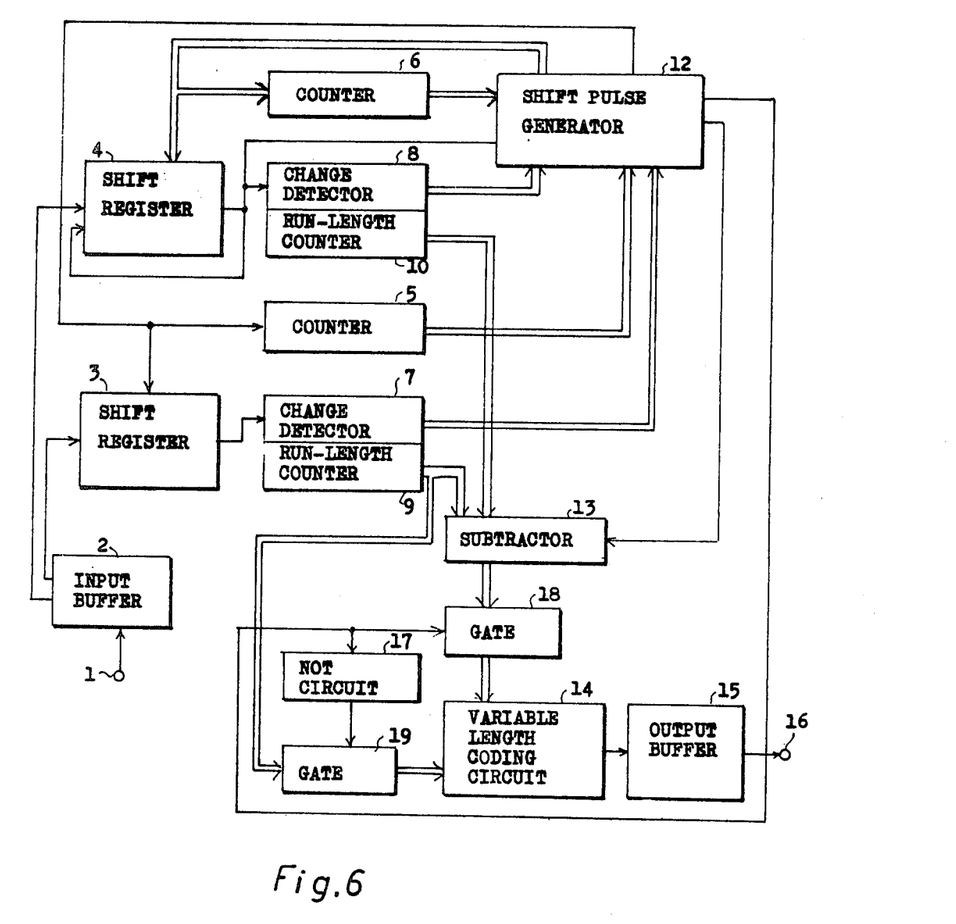

FIG. 6 is a block diagram illustrating another example of this invention in accordance with the abovesaid coding method. This example is different from the example of FIG. 2 in the provision of a NOT circuit 17, gates 18 and 19 and a shift pulse generator 12a. The output from the shift pulse generator 12a is connected to the NOT circuit 17 and the gate 18. The length $d$ in FIG. 5A or 5B is compared with the predetermined number D, and if $d < D$, a pulse appears in the output from the shift pulse generator 12a and the gate 18 is opened, so that exactly the same state as in FIG. 2 is obtained. However, when $d < D$, the gate 18 is not supplied with the pulse, and hence remains closed, and conversely the gate 19 is opened, so that the output from the run-length counter 9, i.e. the length of the coded run is coded in a variable-length code.

Figure 7:
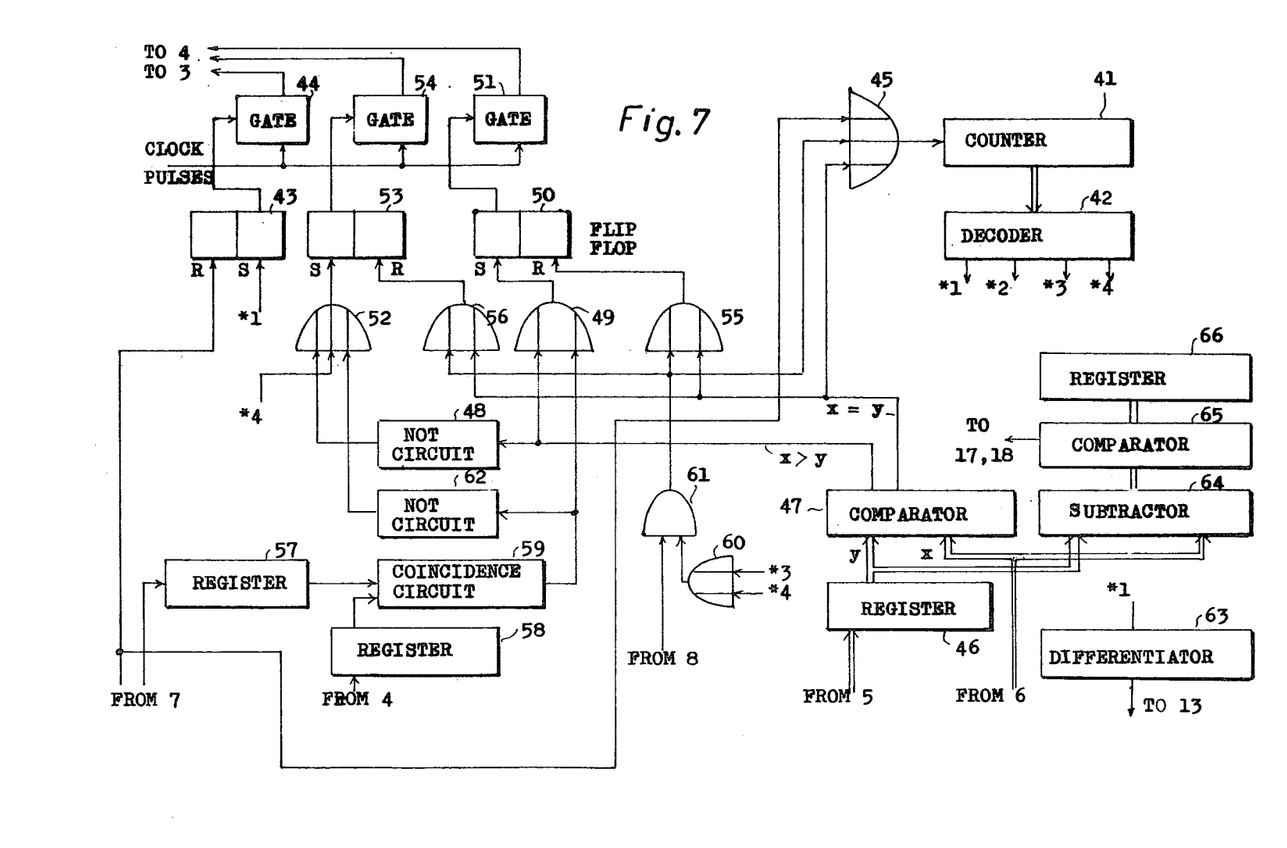

FIG. 7 shows in detail the shift pulse generator 12a, which is substantially identical with that in FIG. 3, and different therefrom in the provision of a subtractor 64, a comparator 65 and a register 66. The subtractor 64 operates at the operation state (iv), to subtract the output value of the register 46 (the absolute address of the starting picture element of the coded run) from the output value of the counter 6 (the absolute address of the picture element following the reference run) to obtain the value $d$ in FIG. 5A or 5B. The comparison of values $d$ with D is performed in the comparator 65, and if $d < D$, a pulse is produced from the comparator 65.

Figure 8:
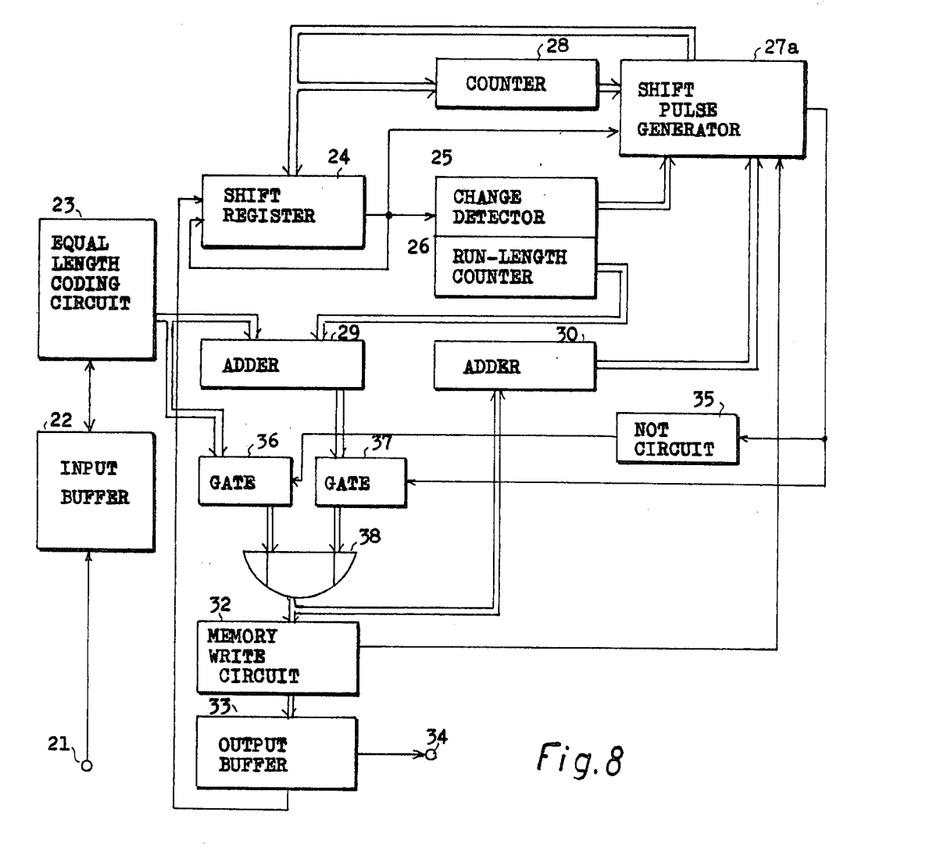

FIG. 8 is a block diagram showing an example of the construction of the receiving side for the reception of the facsimile signal produced by the example of FIG. 6.

FIG. 8 is substantially identical with FIG. 4, except the provision of a NOT circuit 35, gates 36 and 37, an OR circuit 38 and a shift pulse generator 27a. The shift pulse generator 27a is substantially identical with that 27 shown in FIG. 4, but modified, as between the generators 12a and 12 so that the former additionally provided a circuit for deciding the magnitudes of values $d$ and D. If $d < D$, the shift pulse generator 27a applies a pulse to the gate 37, so that the gate 37 is opened, and the circuit of FIG. 8 performs the same operation as the circuit of FIG. 4. However, if $d \geq D$, the gate 36 is opened, so that the output value of the equallength coding circuit 23 is applied as it is to the memory write circuit 32.

In the systems described above, occurrence of an error on the transmission line is likely to exert a great influence on the successively transmitted facsimile signal. Namely, in a case where a code bit for a certain run is made longer by a transmission error by $e$ picture elements than its actual correct value, a run coded using the above erroneous run as the reference run is also decoded longer by $e$ picture elements than its correct value. Further, a run coded using these erroneous runs as the reference run is also decoded longer by $e$ picture elements, and thereafter this is similarly repeated.

The propagation of such erros can be controlled as follows: That is, for coding the lengths of runs on each scanning line, a system of coding the length of the run without referring to the information of the preceding scanning line every predetermined number (for example, 4, 8 or so) of scanning lines, for instance, the conventional run-length coding system is employed, and for the information of the other remaining scanning lines, the coding system already described above is employed.

Figure 9:
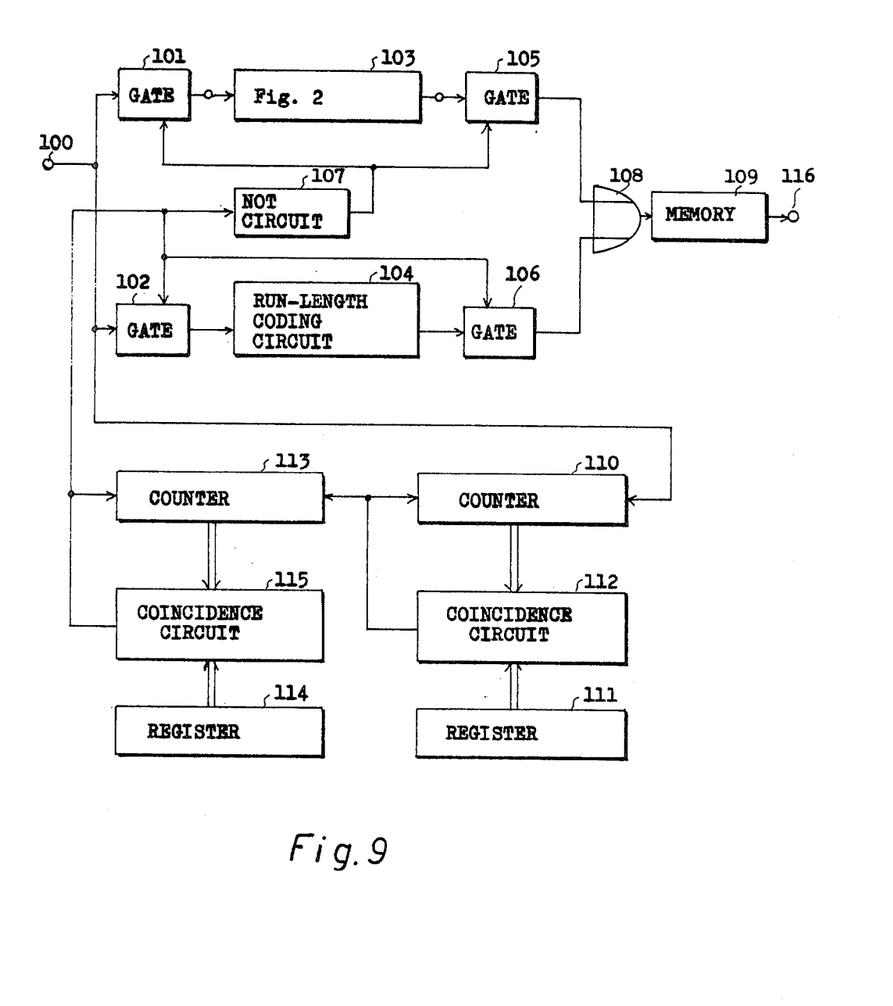
FIG. 9 is a block diagram illustrating a modified embodiment of this invention.

FIG. 9 illustrates an example of a circuit for use in such a case. Reference numeral 100 indicates a facsimile signal input terminal; 101 and 102 designate gates; 103 identifies, for example, the coding circuit shown in FIG. 2; 104 denotes a known run-length coding circuit; 105 and 106 represent gates; 107 shows a NOT circuit; 108 refers to an OR circuit; 109 indicates a memory; 110 designates a counter for counting the number of inputs to the input terminal 100; 111 identifies a register for storing the number of picture elements on one scanning line; 112 denotes a coincidence circuit which produces a pulse only when two inputs thereto are coincedent with each other; 113 represents a counter for counting the output pulses derived from the coincidence circuit 112; 114 shows a register for storing a predetermined number (for instance, 4, 8, or so); 115 refers to a coincidence circuit which produces a pulse only when two inputs thereto are coincedent with each other; and 116 indicates an output terminal.

The operation of the circuit shown in FIG. 9 is as follows: The input signals from the input terminal 100 are all counted by the counter 110. Since the register 111 has stored therein the number of picture elements included in one scanning line, the coincidence circuit 112 produces a pulse upon completion of the signal of one scanning line. By this pulse, the counter 110 is cleared to zero, so that the coincidence circuit 112 produces a pulse at each completion of the signal of each scanning line. Further, since this output pulse is counted by the counter 113, the result of counting indicates the number of scanning lines. In the register 114, a predetermined number, for example, "4", is stored, so that the coincidence circuit 115 produces an output every four scanning lines in the same manner as described above.

As a result of this, at the times of the signals of first, second, third, fifth, sixth, seventh, ninth, tenth, eleventh, thirteenth, ... scanning lines, the output value of the coincidence circuit 115 the state "0", and the gates 101 and 105 are opened but the gates 102 and 106 are closed. At the times of the signals of the fourth, eight, twelfth, ... scanning lines, the output value of the coincidence circuit 115 is the state "1", and the gates 102 and 106 are opened but the gates 101 and 105 are closed. In other words, the facsimile signal from the input terminal 100 for every fourth scanning line is applied to the run-length coding circuit 104 for run-length coding, and the signals of the other scanning lines are subjected to coding by the coding circuit shown in FIG. 2.

The above has described for the coding circuit, but the decoding circuit is also substantially identical with the circuit of FIG. 9, and the circuits 103 and 104 serve as decoding circuits.

The above is the system of utilizing the run-length coding which achieves coding without using information of the reference scanning line every predetermined number of scanning lines. But it is also possible, of course, to employ a known mode run-length coding method, a plural-scanning-line run-length coding method or a multistage-dividing coding method in place of the above run-length coding method.

This error spread suppressing method is applicable, of course, not only to the system of coding based on the prediction of the run length according to this invention but also to the system of coding a facsimile signal by using information of the preceding scanning line as well as the coded scanning line.

Figure 10:
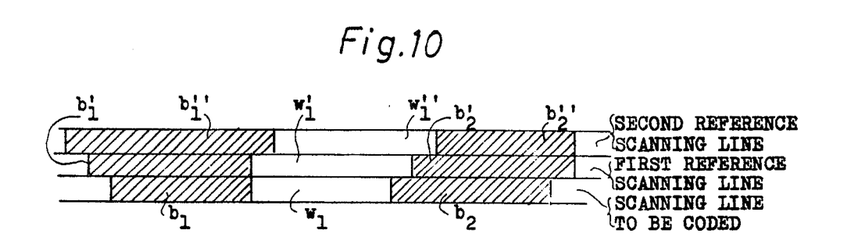

Althrough the foregoing description has been given in connection with the case where the reference scanning line is one, it is possible, of course, to use two or more reference scanning lines. An example of the algorithm therefore is as follows: This will be described with regard to the case of two reference scanning lines, using the example of the facsimile signal of FIG. 10. In FIG. 10, the reference run of, for instance, the black run $b_1$ is the black run $b'_1$ according to the definition mentioned previously, while the reference run for the black run $b'_1$ is a black run $b''_1$. In this way, not only the reference run for the coded run but also the reference run for the above reference run are taken into account, and these reference runs will hereinbelow be referred to as a first reference run and a second reference run, respectively. A predicted value $\hat{r}_c$ of the length of a coded run $r_c$ can be obtained, for instance, as follows:

$$\hat{r}_c = (\bar{r}_1 + \bar{r}_2)/2$$

$$\hat{r}_c = \bar{r}_1 - (\bar{r}_2 - \bar{r}_1) = 2\bar{r}_1 - \bar{r}_2$$

where $\bar{r}_1$ and $\bar{r}_2$ are the lengths of the first and second reference runs, respectively.

Figure 11:
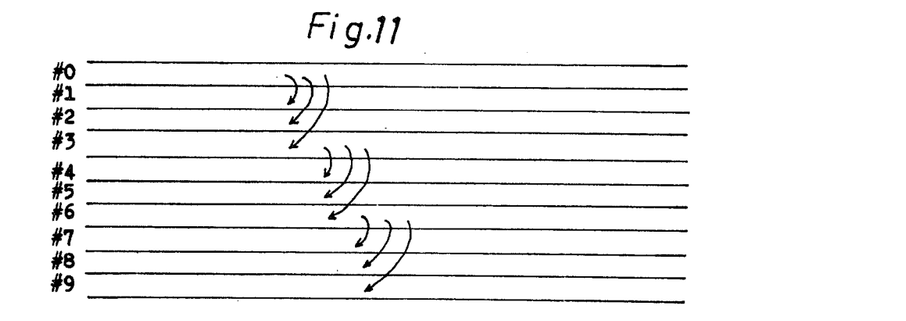

Further, in the foregoing, the reference scanning line is described to be the scanning line immediately preceding the coded scanning line, but may also be, for example, the scanning line immediately preceding the abovesaid reference scanning line. Moreover, it is also possible to change the reference scanning line for each scanning line to be coded. In FIG. 11, there are shown ten scanning lines #0 to #9. For example, in case of coding the scanning lines #1, #2 and #3, the scanning line #0 is used as the reference scanning line; in case of coding the scanning lines #4, #5 and #6, the scanning line #3 is employed as the reference scanning line; and in case of coding the scanning lines #7, #8 and #9, the scanning line #6 is used.

As has been described above in detail, this invention can be realized by the construction of substantially the same scale as the run-length coding method, and has a merit of having a high degree of compression. Moreover, spreading of an error can be easily controlled only by a slight modification of the circuit construction.

What we claim is:

1. A facsimile signal coding system comprising:
   input terminal means for receiving a facsimile signal obtained by scanning an original picture;
   storage means connected to said input terminal means for successively and temporarily storing the lengths and positions on each scanning line of runs of black or white signal;
   first register means connected to said storage means for shifting the runs of black and white on a scanning line to be coded;
   second register means connected to said storage means for shifting the runs of black and white on a reference scanning line preceding said scanning line to be coded;
   first counter means connected to said first register means for determining the length and position of an instant run to be coded on said scanning line to be coded;
   second counter means connected to said second register means for determining, as reference run information, the length and position of a reference run on said reference scanning line, wherein said reference run is defined as the run including the reference picture element just above the first occurring picture element of the instant run to be coded when said first occurring picture element and said reference picture element just above said first occurring picture element have the same state, and said reference run is defined as the run succeeding the run including the reference picture element just above the first occurring picture element of the instant run to be coded when said first occurring picture element and said reference picture element just above said first occurring picture element have different states;
   subtractor means connected to said first counter means and said second counter means for determining a difference between respective run lengths of said instant run to be coded and said reference run and for developing an error signal representative of the difference;
   coding means connected to said subtractor means for coding said error signal to develop a coded output pulse train; and
   output terminal means connected to said coding means for sending out said coded output pulse train.

2. A facsimile signal coding system according to claim 1, further including:
   third counter means connected to said input terminal means for developing a gate pulse every predetermined number of scanning lines of said facsimile signal;
   second coding means operatively connected to said input terminal means for coding the facsimile signal to develop a second run-length coded pulse train;
   an OR gate inserted between said first mentioned coding means and said output terminal means for combining the first mentioned coded output pulse train and said second runlength coded pulse train; and gate means connected to said input terminal means, said storage means and said second coding means to inhibit said facsimile signal for said storage means and to pass the same for said second coding means in response to said gate pulse.

3. A facsimile signal coding system comprising:

input terminal means for receiving a facsimile signal obtained by scanning an original picture;

storage means connected to said input terminal means for successively and temporarily storing the lengths and positions on each scanning line of runs of black or white signal;

first register means connected to said storage means for shifting the runs of black and white on a scanning line to be coded;

second register means connected to said storage means for shifting the runs of black and white on a reference scanning line preceding said scanning line to be coded;

first counter means connected to said first register means for determining the length and position of an instant run to be coded on said scanning line to be coded;

second counter means connected to said second register means for determining, as reference run information, the length and position of a reference run on said reference scanning line, wherein said reference run is defined as the run including the reference picture element just above the first occurring picture element of the instant run to be coded when said first occurring picture element and said reference picture element just above said first occurring picture element have the same state, and said reference run is defined as the run succeeding the run including the reference picture element just above the first occurring picture element of the instant run to be coded when said first occurring picture element and said reference picture element just above said first occurring picture element have different states;

subtractor means connected to said first counter means and said second counter means for determining a difference between respective run lengths of said instant run to be coded and said reference run and for developing an error signal representative of the difference;

coding means connected to said subtractor means for coding said error signal to develop a coded output pulse train;

comparator means connected to said subtractor means for developing a detection pulse when said error exceeds a predetermined value;

control means connected to said subtractor means, said coding means, said second counter means, and said comparator means for further applying the length of said instant run to said coding means in response to said detection pulse while inhibiting said error; and output terminal means connected to said coding means for sending out said coded output pulse train.

4. A facsimile signal coding system according to claim 3, further including:

third counter means connected to said input terminal means for developing a gate pulse every predetermined number of scanning lines of said facsimile signal;

second coding means operatively connected to said input terminal means for coding the facsimile signal to develop a second run-length coded pulse train;

an OR gate inserted between said first mentioned coding means and said output terminal means for combining the first mentioned coded output pulse train and said second run-length coded pulse train; and gate means connected to said input terminal means, said storage means and said second coding means to inhibit said facsimile signal for said storage means and to pass the same for said second coding means in response to said gate pulse.

5. A facsimile signal coding system comprising:

input terminal means for receiving a facsimile signal obtained by scanning an original picture;

storage means connected to said input terminal means for successively and temporarily storing the lengths and positions on each scanning line of runs of black or white signal;

first register means connected to said storage means for shifting the runs of black and white on a scanning line to be coded;

second register means connected to said storage means for shifting the runs of black and white on a reference scanning line preceding said scanning line to be coded;

first counter means connected to said first register means for determining the length and position of an instant run to be coded on said scanning line to be coded;

second counter means connected to said second register means for determining, as reference run information, the length and position of a reference run on said reference scanning line, wherein said reference run is defined as the run including the reference picture element just above the first occurring picture element of the instant run to be coded when said first occurring picture element and said reference picture element just above said first occuring picture element have the same state, and said reference run is defined as the run succeeding the run including the reference picture element just above the first occurring picture element of the instant run to be coded when said first occurring picture element and said reference picture element just above said first occurring picture element have different states;

subtractor means connected to said first counter means and said second counter means for determining a difference between respective run lengths of said instant run to be coded and said reference run and for developing an error signal representative of the difference;

coding means connected to said subtractor means for coding said error signal to develop a coded output pulse train;

comparator means connected to said subtractor means and said first counter means for developing a detection pulse when said error exceeds the length of said instant run;

control means connected to said subtractor means, said coding means, said second counter means and said comparator means for further applying the length of said instant run to said coding means in response to said detection pulse while inhibiting said error; and output terminal means connected to said coding means for sending out said coded output pulse train.

6. A facsimile signal coding system according to claim 5, further including:

third counter means connected to said input terminal means for developing a gate pulse every predetermined number of scanning lines of said facsimile signal;

second coding means operatively connected to said input terminal means for coding the facsimile signal to develop a second run-length coded pulse train;

an OR gate inserted between said first mentioned coding means and said output terminal means for combining the first mentioned coded output pulse train and said second run-length coded pulse train; and gate means connected to said input terminal means, said storage means and said second coding means for inhibiting said facsimile signal for said storage means and for passing the same for said second coding means in response to said gate pulse.

7. A facsimile signal coding system comprising:

input terminal means for receiving a facsimile signal obtained by scanning an original picture;

storage means connected to said input terminal means for successively and temporarily storing the lengths and positions on each scanning line of runs of black and white signal;

first register means connected to said storage means for shifting the runs of black and white on a scanning line to be coded;

second register means connected to said storage means for shifting the runs of black and white on a reference scanning line preceding said scanning line to be coded;

first counter means connected to said first register means for determining the length and position of an instant run to be coded on said scanning line to be coded;

second counter means connected to said second register means for determining, as reference run information, the length and position of a reference run on said reference scanning line, wherein said reference run is defined as the run including the reference picture element just above the first occurring picture element of the instant run to be coded when said first occurring picture element and said reference picture element just above said first occurring picture element have the same state, and said reference run is defined as the run succeeding the run including the reference picture element just above the first occurring picture element of the instant run to be coded when said first occurring picture element and said reference picture element just above said first occurring picture element have different states;

subtractor means connected to said first counter means and said second counter meand for determining a difference between respective run lengths of said instant run to be coded and said reference run and for developing an error signal representative of said difference;

coding means connected to said subtractor means for coding said error signal to develop a coded output pulse train;

position comparison means connected to said first counter means and said second counter means for developing a control pulse when a difference between the position of said instant run and the position of said reference run exceeds a predetermined value;

control means connected to said subtractor means, said coding means, said second counter means and said comparator means for further applying the length of said instant run to said coding means in response to said control pulse while inhibiting said error; and output terminal means connected to said coding means for sending out said coded output pulse train.

8. A facsimile signal coding system according to claim 7, further including:

third counter means connected to said input terminal means for developing a gate pulse every predetermined number of scanning lines of said facsimile signal;

second coding means operatively connected to said input terminal means for coding the facsimile signal to develop a second run-length coded pulse train;

an OR gate inserted between said first mentioned coding means and said output terminal means for combining the first mentioned coded output pulse train and said second run-length coded pulse train; and gate means connected to said input terminal means, said storage means and said second coding means for inhibiting said facsimile signal for said storage means and for passing the same for said second coding means in response to said gate pulse.

* * * * *